Patented Jan. 3, 1933

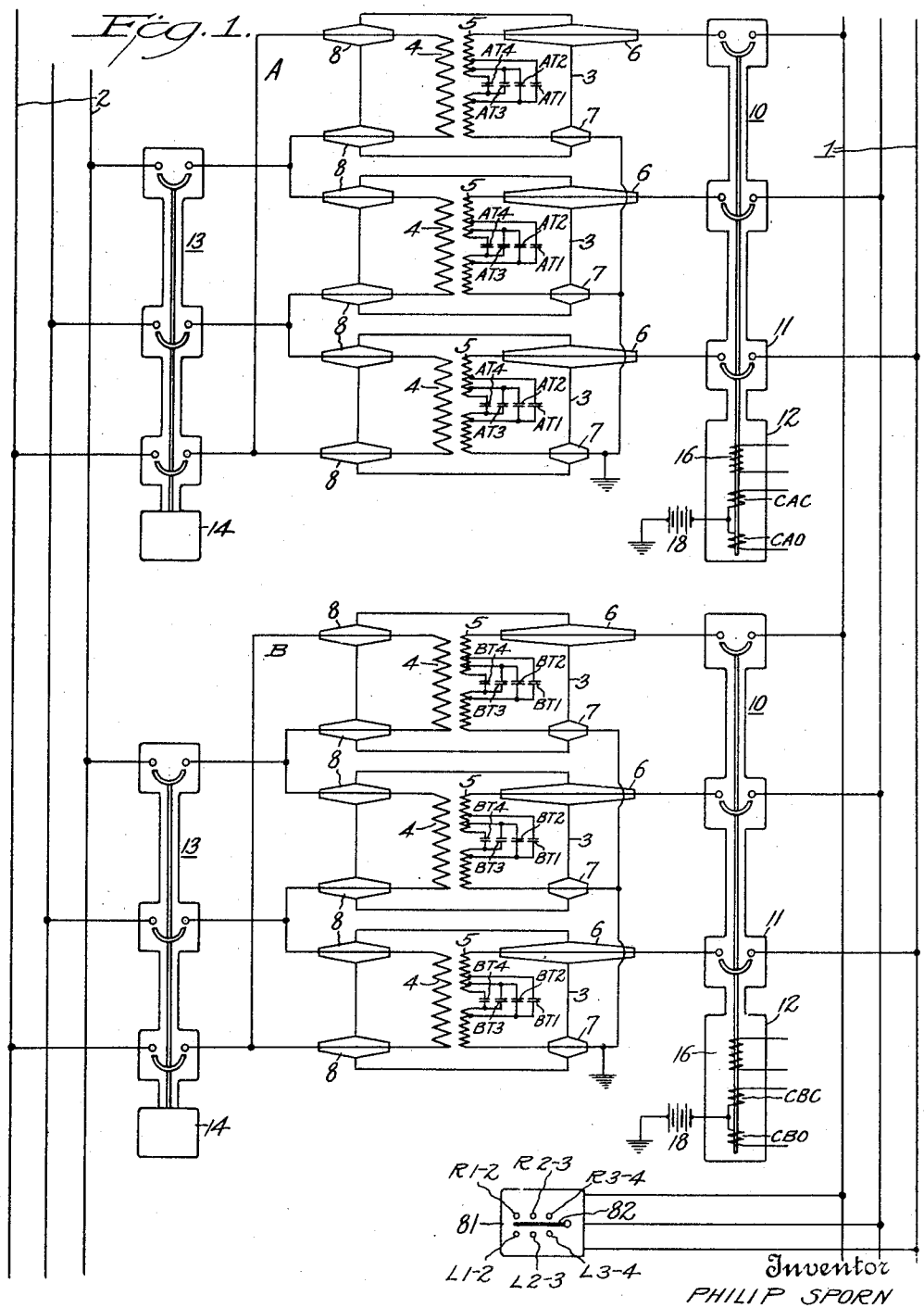

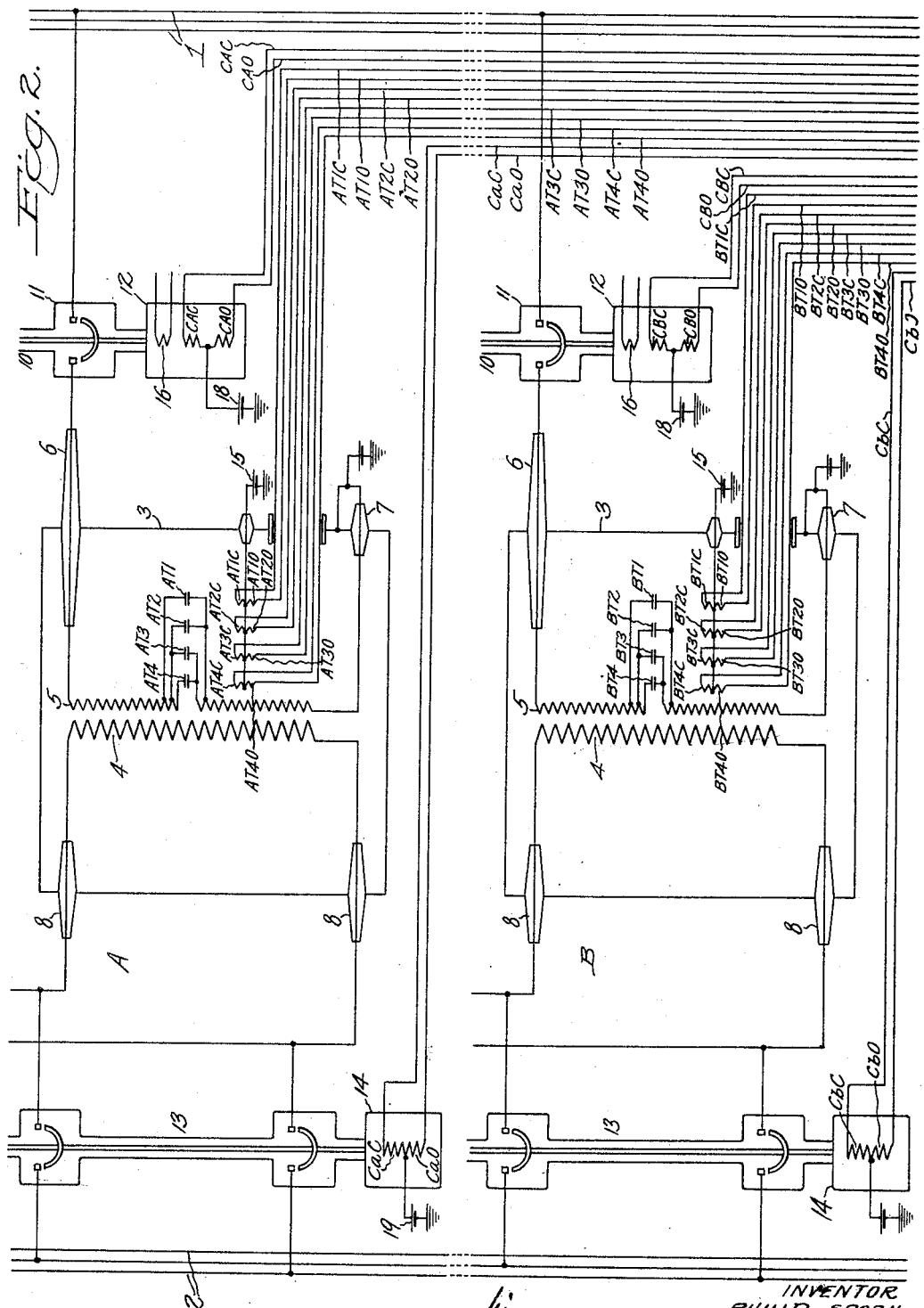

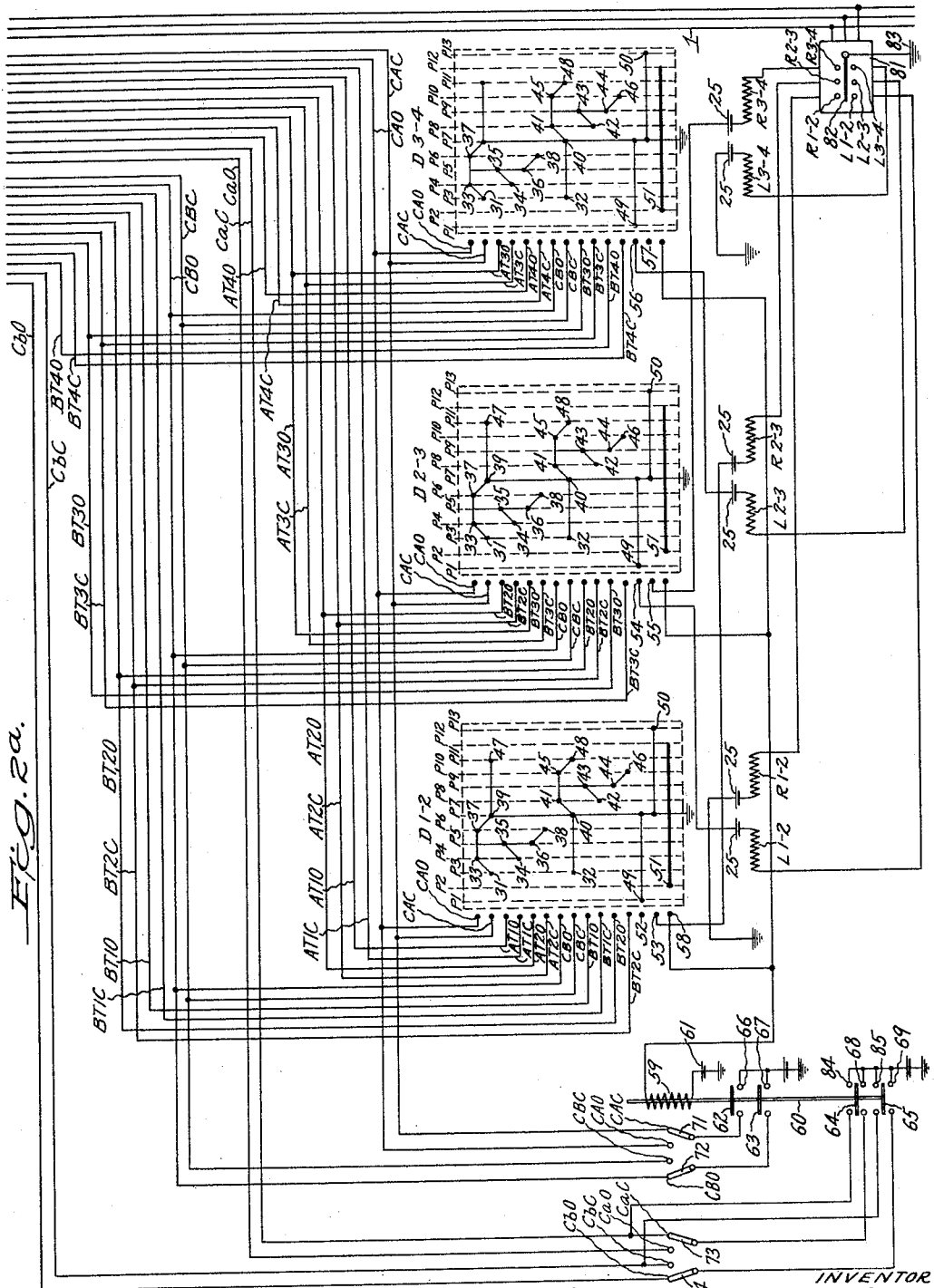

1,892,752

UNITED STATES PATENT OFFICE

PHILIP SPORN, OF NEW YORK, N. Y.

TRANSFORMER REGULATING SYSTEM

Application filed June 6, 1930. Serial No. 459,457.

My invention relates to transformer regulating systems, and it has among its objects the provision of an improved system for regulating the transformation ratio of the transformers under load by a special arrangement of tap-changing transformers.

The invention will be best understood from the following description of an exemplication thereof, reference being had to the accompanying drawings wherein, Fig. 1 is a diagrammatic view of a transformer station embodying the invention; and Figs. 2 and 2a, when placed side by side in the order named, are a more detailed diagrammatic view illustrating the elements of one phase of the transformer system shown in Fig. 1, with the associated operating and control circuits exemplifying the invention.

One of the most effective methods of regulation of the voltage and power distribution systems and power applications resides in the use of load ratio tap-changers under utilization of double winding transformers. Such transformers are provided with sets of parallel windings, each of the parallel windings having taps permitting variation of the number of turns connected in the circuit. Normally, both windings operate in parallel. When the voltage is to be adjusted, say to a higher voltage, first one of the parallel windings is cut off from the circuit by some suitable circuit-breaking device, the tap-changing switches adjusted, then the winding again connected into the circuit, and the same procedure then followed with the second parallel winding. During the period while the taps are changed, first one winding, then the other winding of the transformer has to carry the entire load.

In order to satisfactorily operate such double winding transformers, the transformer must be provided not only with circuit breakers for cutting it off from the line or bus-bar, but also with additional circuit breakers for disconnecting each of the tap-changing windings of the transformer. Since the amount of current that is to be broken is substantial, these special circuit breakers for the winding halves must be located in separate compartments or tanks, as otherwise, the oil in the transformer tank would quickly become carbonized. The use of such special oil circuit breaker tanks for opening each of the tap-changing windings in connection with the load ratio adjusting operations, requires in turn, the bringing in of the leads from the transformer to the circuit-breaking device. This imposes limitations on the choice of the point of connection of the tap-changing device and in general, the design of this type of transformer, in order to avoid expensive bushings or leads from the individual transformer windings to the auxiliary circuit breakers used for the tap-changing operations.

The transformer regulating system of my invention is based on the fact that in most of the applications where transformer load ratio adjustment is required, there are usually available at least two transformer banks. Of these transformer banks, one may constitute either a reserve or may be used as a stand-by transformer for most of the day and be loaded only during the period of peak load; or both of the transformer banks may be carrying the load for most of the day. Where such parallel transformer banks are employed, each bank is, as a rule, provided with its own circuit-breaking device which permits its disconnection from the lines on which it operates.

In accordance with my invention, I provide each of the independent transformers with a set of ratio adjusting taps and operate the two separate transformers with their tap-changing apparatus as if they constituted the two parallel tap-changing windings of a single transformer as used heretofore. In carrying out tap-changing operations under load with such equipment, I do not have to use additional circuit breakers for temporarily cutting off one and the other winding from the line to permit tap-changing, but I utilize the regular circuit breaker devices associated with the individual transformers for closing and opening their connections to the line during tap-changing operations.

In Fig. 1 my invention is exemplified as applied to a transformer station in which two three-phase transformer banks A, B, respectively, serve to interconnect a three-phase high voltage line 1 to a three-phase line 2, line 1 being for instance a 132,000-volt line, while line 2 is a 33,000-volt line. Each transformer bank comprises three transformer tanks 3. Each tank is filled with oil and has immersed in the oil a transformer core with its low voltage transformer windings 4 and high voltage transformer windings 5. The high voltage transformer windings 5 of the three transformer phases of each bank are shown connected in star with the star-point grounded, while the low voltage transformer windings 4 of each bank are shown connected in delta.

As indicated in the drawings, each transformer tank is provided with a high voltage bushing 6 through which connection is made to the high voltage end of the high voltage transformer windings 5, and another bushing 7 through which connection is made to the grounded end of said windings. The low voltage windings 4 of the tanks are likewise led through the tanks by means of insulating bushings 8 of sufficient insulating capacity. A three-phase oil circuit breaker 10 with a separate circuit breaker unit 11 for each phase and a common actuating device 12 serves to connect the high voltage leads of the three high voltage transformer windings to the three phases of the high voltage line 1. Another three-phase oil circuit breaker 13 with an actuating device 14 serves similarly to effect connection between the delta connected low voltage windings and the three phases of the low voltage line 2.

As pointed out before, it has heretofore been the practice to effect voltage regulation or control with such transformers by making each transformer bank independently adjustable under load. Because of the voltage limitations, the low voltage windings 4 are as a rule made of two parallel winding halves, each winding half being provided with a tap-changer or ratio adjuster located inside the transformer tank, and a circuit breaker outside of the transformer tank. In order to change taps, one of the parallel winding halves was opened by means of an auxiliary circuit breaker and the taps were changed while the winding was without load. During this period the entire load was carried by the other winding half. After the tap of one winding half was adjusted, the auxiliary circuit breaker in said winding half was closed again and thereupon the auxiliary circuit breaker of the second winding half opened, the tap-changer adjusted, and the auxiliary circuit breaker of the second half again closed. Since such arrangement made it necessary to bring out leads from the transformer windings to the auxiliary circuit breakers, it was as a rule necessary to use the tap-changing equipment only on the low voltage windings of the transformer, introducing thereby restrictions in the design of the regulating system and frequently increasing the cost of the equipment. By the combination of the transformers of two independent transformer banks to operate in a manner similar to the double-winding transformers as heretofore used, most of the limitations encountered heretofore in the design of such double-winding tap-changing transformers are eliminated and at the same time, a great simplification of the equipment and reduction of the cost of the apparatus used are effected. Furthermore, by the arrangement of my invention, I am able to effect tap-changing on the high voltage windings without in any way complicating the arrangement of the transformers of the operating circuits.

As seen in the drawings, the high voltage transformer windings 5 of each phase of the transformer bank A are provided with tap switches AT1, AT2, AT3, AT4. When switch AT1 is closed, the high voltage transformer windings 5 operate with the smallest number of turns. When switch AT1 is opened and switch AT2 is closed, additional turns are connected in the active circuit of the high voltage windings 5. By successive closure of the switches AT3 and AT4 the number of turns in the high voltage windings 5 may be further increased in two steps. Thus the number of turns active in the high voltage transformer windings 5 may be changed in four steps, either to increase or lower the transformation ratio of the transformer to suitably regulate the voltage of the systems and the power flow therebetween.

The transformers of the transformer bank B have their high voltage windings 5 similarly provided with tap switches BT1, BT2, BT3 and BT4.

In accordance with my invention, I provide a control system for the circuit breakers which control the flow of current through the transformers of the two transformer banks, and for the tap-changing switches on the windings of the individual phases of the transformer banks whereby the transformation ratio of the transformers may be varied under load by utilization of the transformers of one bank to momentarily take over the load of the transformers of the other bank while their transformation ratio is adjusted, and also permitting independent control of the normal operation of each transformer of the transformer bank. Such control system is shown diagrammatically in Figs. 2 and 2a of the drawings in which only the elements of one phase of each of the transformer banks A and B are illustrated in order to simplify the drawings.

Referring to Figs. 2 and 2a, each of the tap switches AT1, AT2, AT3 and AT4 is provided with a closing coil AT1C, AT2C, etc., and an opening coil AT1O, AT2O, etc. The tap switches AT1 etc. and the closing and opening coils AT1C etc. and AT1O etc. therefor are so arranged that upon momentary energization of the closing coil, the corresponding tap switch closes and remains closed, and upon momentary energization of the opening coil, the corresponding tap switch opens and remains open. Any of the various types of switches known in the art may be used, and instead of a plurality of switches in which each has independent, electrically controlled coils, cam or motor-operated contactors or tap-changers may be used, their control being effected in a manner analogous to the electrical control of the tap-changing switches herein described. Energy is supplied to the several closing and opening coils AT1C etc. and AT1O etc. through a common connection to a suitable source of electrical energy, as a battery 15, the other terminal of which may be connected to a common grounded bus-bar indicated in the drawings by the ground sign.

The actuating device 12 of the high voltage circuit breaker 10 is shown provided with an automatic tripping coil 16 for securing automatic opening of the circuit breaker in response to abnormal line conditions, in accordance with any of the usual practices. The actuating device is further provided with a closing coil CAC upon energization of which the circuit breaker 10 closes, and an opening coil CAO upon energization of which the circuit breaker 10 opens, the two coils being arranged for energization by a suitable source 18, the other terminal of which is shown grounded. The low voltage circuit breaker 14 of the transformer bank A is likewise provided with a closing coil CaC and an opening coil CaO which may be similarly energized from a suitable source 19 to close or open the circuit breaker. Each transformer tank of bank B is similarly provided with transformer taps BT1, BT2, etc., actuating coils therefor BT1C to BT4C, and BT1O to BT4O, and the associated circuit breakers are similarly provided with closing coils CBC, CbC and opening coils CBO and CbO. To control the operation of the various control circuits for the tap switches and for the circuit breakers in the operation of tap-changing equipment according to my invention I have shown three contactor drums D1—2, D2—3 and D3—4. These contactor drums may have the form of any of the familiar types of drums having contacts adapted to engage contact fingers in the various positions of the drum to establish suitable control circuits, the drum being operated either in one direction or in the other direction by a suitable motor. In the drawings, I have shown each contactor drum in developed condition, the heavy dots and heavy lines on the drum constituting contact members which become engaged with contact fingers placed along the drum. Drum D1—2 is arranged to be actuated by a motor having an actuating coil L1—2 which causes movement of the drum in one direction to lower the voltage and another actuating coil R1—2 which causes movement of the drum in opposite direction to raise the voltage. Similarly, drum D2—3 is provided with actuating coils L2—3 and R2—3, and drum D3—4 with actuating coils L3—4 and R3—4 to effect movement of the drums either to the left or to the right to cause lowering or raising of the voltage. Suitable electrical energy sources such as batteries 25 are shown connected in the circuits of the several coils L1—2 etc., R1—2 etc., for energizing the coils, respectively.

Contactor drum D1—2 serves to control the operation of the tap switches and of the circuit breakers of the two transformer banks during the step of opening tap switches AT1, BT1, and closing the tap switches AT2, BT2, or vice versa. As shown in the drawings, the stationary contacts of the contactor drum D1—2 comprise a pair of contacts CAO and CAC leading to the opening coil and closing coil of the actuating device 12 of the high voltage circuit breaker 10; contacts AT1O and AT1C are connected to the closing and opening coils of the tap switch AT1 having the same designation. Similarly, contacts AT2O and AT2C lead to the closing and opening coils of the tap switches AT2 having like designation. The contactor drum D1—2 is provided further with contact fingers CBO and CBC leading to the similarly designated opening and closing coils of the actuating device of the high voltage circuit breaker 10 of the transformer bank B, and contacts BT1O, BT1C, BT2O, BT2C leading to similarly designated closing and opening coils of the tap switches BT1, BT2 of the transformer bank B.

Each drum is arranged to be moved by its actuating coils L1—2, R1—2 etc. through a range of thirteen positions indicated in the drawing by designating characters P1 to P13, and the drum is provided with a set of contact members 31 to 51, which are interconnected and indicated as being grounded to establish control connections with the various control circuits, as explained hereinafter.

Contact members 49 and 50 on the drums cooperate with the stationary contact members 52, 53, 54, 55, 56 and 57 on the three drums D1—2, D2—3 and D3—4 to establish interlocking circuits between the several drums whereby the proper sequence of operations of the control drums is secured. The contact member 51 of each drum is shown in the form of a contact bar arranged to make contact with the cooperating stationary contact member 58. The stationary contact members 58 of the three drums are interconnected and lead to one end of an actuating coil 59 of an interlocking relay 60, the other end of the actuating coil leading to one pole of a suitable energy source 61, the other pole of which is grounded. The interlocking relay 60 is shown provided with four contact bars 62, 63, 64 and 65. When the actuating coil 59 of the interlocking relay 60 is de-energized, its contact bars 62 to 65 complete at their back contacts 66, 67, 68 and 69 circuits from the ground or return bus-bar to control switches 71, 72, 73 and 74. Switch 71 serves to establish an energizing connection either to the closing coil CAC or to the opening coil CAO of the high voltage circuit breaker 10 of the transformer bank A, and switch 72 serves similarly to establish energizing circuits to either the closing or opening coils CBC, CBO of the high voltage circuit breaker 10 of the transformer bank B. Switches 73 and 74 serve similarly to complete circuits to the closing and opening coils CaC and CaO, CbC and CbO of the low voltage circuit breakers 14 of the two transformer banks A and B.

The voltage relay 81 controlled by the conditions on the high voltage bus bar or line 1 serves to actuate a movable contact member 82 adapted to engage stationary contacts R1—2, R2—3, R3—4 when the voltage drops, and contact members L1—2, L2—3, L3—4 when the voltage rises. Contact members R1—2, R2—3 and R3—4 of the relay 81 serve to complete energizing circuits for the actuating coils R1—2, R2—3 and R3—4 of the three drums when the voltage is too high, and the contact members L1—2, L2—3 and L3—4 serve to complete energizing circuits for the actuating coils L1—2, L2—3 and L3—4 when the voltage is too low.

With the foregoing arrangement, the operation of the system will be as follows:

Let it be assumed that the apparatus of the system is in the condition where only one transformer bank, namely transformer bank A, is under load, and transformer bank B is not loaded and normally disconnected from the line. Let us further assume that at the moment under consideration, the transformer bank A is operating with the smallest number of turns, the tap switch AT1 of the transformers 3 of this bank being closed, and the other taps open. As will be explained hereinafter, the tap-changing equipments of the two transformer banks A and B always operate in unison, so that at the time when the transformer bank A operates with its tap switch AT1 closed, the transformer bank B has its corresponding tap switch BT1 closed. This operating condition corresponds to the positions of the three control drums D1—2, D2—3 and D3—4, shown in the drawings, the three drums being in the positions indicated by the designating letter P1.

In this condition of the system, circuit breakers 10 and 13 of the transformer bank A will be closed, and circuit breakers 10 and 13 of the transformer bank B will be open, this being insured by the interlocking relay 60, the actuating coil 59 of which is at the moment de-energized. In this position of the interlocking relay 60, contact bar 62 energizes the closing coil CAC of the high voltage circuit breaker of the transformer bank A; contact bar 63 energizes the opening coil CBO of the high voltage circuit breaker of transformer bank B; contact member 64 energizes the closing coil CaC of the low voltage circuit breaker 14 of the transformer bank A; and contact member 65 energizes the opening coil CbO of the low voltage transformer of the transformer bank B. Let us now assume that the line relay 81 has been actuated by the line condition, say a drop in the line voltage, to a position where the contact member 82 moves up and establishes engagements with the contact members R1—2, R2—3 and R3—4. This initiates a series of tap-changing operations as a result of which the load is first momentarily transferred from transformer bank A to transformer bank B; thereupon the tap switch AT1 of transformer bank A is opened; then tap switch AT2 closed; then circuit breaker 10 of transformer bank A again closed; then the circuit breaker of transformer bank B opened; then tap BT1 opened; then tap BT2 closed; and then the transformer bank B again brought to the no-load condition in which it initially was, the transformer bank A alone carrying the load, as before. This sequence of operations will now be described in detail.

Upon engagement of the contact member 82 of the relay 81 with the upper contact members, circuits are established from the ground 83 to the actuating coils R1—2, R2—3, R3—4. This will cause energization of the actuating coils R1—2 from the energy sources 25 connected in its circuit, the actuating coils R2—3 and R3—4 remaining for the present de-energized, since the interlocking circuits of these two actuating coils are at the moment open at the contacts 53 and 55 of drums D1—2 and D2—3, respectively. Upon energization of the actuating coil R1—2, a movement will be imparted to the drum D1—2 which will carry the drum with its contact members from the position P1 to the position P13, the contact members 31 to 51 on the drum establishing a series of control connections through the engagement with the stationary contact members of the drum. As soon as the drum reaches position P2, contact member 51 comes into engagement with contact member 58 and establishes an energizing circuit for the actuating coil 59 of the interlocking relay 60, causing the contact members of the relay to move to the upper position. This opens the circuits to the switches 71, 72 at the contacts 66, 67, of the interlocking relay 60, releasing the high voltage oil circuit breakers 10 of both transformer banks from the control action of the switches 71 and 72, by means of which the normal position of the circuit breakers is controlled. At the same time, the contact bars 64 and 65 open the control circuits to the switches 73 and 74 of the low voltage circuit breakers 14, establishing at the front contacts 84 and 85 energizing connections for the closing coils of the low voltage circuit breakers of the two transformer banks, securing closure of both low voltage circuit breakers. As a result, no matter what the position of the two circuit breakers was before the initiation of the tap-changing operation, as soon as the drum D1—2 reaches its position P2, both low voltage circuit breakers of the two transformer banks become closed and both high voltage circuit breakers of the two transformer banks come entirely under the control of the drum D1—2.

In the next position P3 of the drum D1—2, contact member 31 engages contact member CAC and contact member 32 engages contact member CBC. This causes energization of the closing coils CAC and CBC of the high voltage circuit breakers of both banks, insuring that both transformers are on the lines.

In the next position P4 of the drum D1—2, contact member 33 engages contact member CAO and contact member 34 engages contact member AT1C. This causes energization of the opening coil CAO of the high voltage circuit breaker of bank A with the resulting opening of the high voltage transformer of this bank; the energization of the tap-closing coil AT1C at the contact member 34 being without further effect, as the tap switch AT1 is at the moment in closed position.

In the next position P5, contact member 35 engages contact member AT1O and contact member 36 engages contact member AT2O, causing energization of opening coil AT1O of tap switch AT1 at AT2O of tap switch AT2. This causes opening of the tap switch AT1, tap switch AT2 already being open and being unaffected by the energization of its opening coil.

In the next position P6 contact 37 engages contact CAO, energizing the opening coil of circuit breaker CAO, which is however already opened; and contact member 38 engages contact member AT2C, energizing the closing coil of the tap switch AT2C and causing tap switch AT2 to become closed in lieu of the previously closed tap switch AT1.

In the next position P7 of the drum D1—2, contact member 39 engages contact member CAC and energizes the closing coil CAC of the high voltage circuit breaker of transformer bank A and causes it to close, thereby again bringing the transformer bank A under load, but now with the tap switch AT2 closed.

In the next position P8 of the drum D1—2, contact 41 engages contact CBO and energizes opening coil CBO of the high voltage circuit breaker 10 of bank B, opening its line connections; contact 42 engages contact BT1C, energizing the closing coil BT1C of the tap switch BT1 which is already closed.

In the next position P9, contact member 43 energizes the opening coil BT1O of the high voltage transformer of transformer bank B, the circuit established at the contact member 44 being without further effect on the arrangement of the system.

In the next position P10, contact 45 engages contact CBO, without further affecting the circuit breaker, and contact 46 engages contact BT2C resulting in closure of the second tap switch BT2 of the transformer bank B.

In the next position P11 of the drum D1—2, contact member 47 engages contact CAC without further affecting the circuit breaker, and contact 48 engages contact CBC, causing energization of the closing coil CBC of the high voltage circuit breaker of bank B, and closure of the circuit breaker.

Throughout the entire operation of the drum prior to the position P2 until after the position P11, contact bar 51, through its engagement with the contact member 58 holds energized the actuating coil 59 of the interlocking relay 60. After leaving position P12, contact bar 51 breaks its engagement with the contact 58, de-energizing actuating coil 59 and releasing the interlocking relay 60 which returns to its lower position. In this position, the circuit breakers 10 and 14 of both transformer banks are again returned to the control of the control switches 71, 72, 73 and 74; and under the conditions assumed, as shown in the drawings, the circuit breakers 10 and 14 of transformer bank A will remain closed corresponding to the closed position of the control switches 71 and 73, and the circuit breakers 10 and 14 of bank B will be opened corresponding to the positions of the control switches 72 and 74.

The movement of the control drum D1—2 comes to a rest in position P13, in which position its contact 50 comes into engagement with the stationary contact 53, preparing an energizing circuit for the actuating coil R2—3 of drum D2—3. If the change of the tap connections restored normal line conditions, and caused the line relay 81 to return to normal wherein the contact member 82 floats in its neutral position, the entire tap-changing mechanism will come to a rest and the system will continue to operate with the two transformers having their tap switches AT2 closed, but only transformer bank A carrying the load.

This condition of the system may continue, or changes in the line condition may require either the raising or lowering of the voltage by closing the next higher or the next lower transformer tap switch. I shall first describe the operation of the system in case the line conditions cause the line relay 81 to be actuated so as to produce a rise in the transformation ratio.

If under such conditions the line relay 81 causes contact member 82 to move upwardly into engagement with the contact members R1—2, R2—3 and R3—4, an energized circuit will be completed for actuating coil R2—3 by way of its energy source 25 and the interlocking contacts 53 and 50 of the drum D1—2. The actuating coil R3—4 of drum D3—4 will remain de-energized, as its circuit is still open at the interlocking contact 55 of drum D2—3. In this position of the mechanism, the actuating coil R1—2 will be held energized, but the energization of this coil will have no further effect, since the drum D1—2 is already in its extreme position P13 and cannot move further. By suitable interlocking circuits, arrangements can be made whereby the actuating coil R1—2 is held energized only while its operation is required, arrangements for this purpose being well understood in the art.

As a result of the energization of the actuating coil R2—3, drum D2—3 will start moving from its position P1 to its position P13 and will cause a sequence of operations similar to the sequence of operations produced by the movement of the drum D1—2. Again interlocking relay 60 will be actuated to its upper position, removing the control of the circuit breakers of the two transformer banks from the control action of the control switches 71 to 74 and causing the operation of the circuit breakers of both banks to be subjected to the control action of the drum D2—3. In going through the various positions the drum D2—3 will, in a manner analogous to that described in connection with the operation of the drum D1—2, cause first, closure of the high voltage circuit breakers 10 of both banks A and B, thereby bringing transformation bank B under load; then opening of the high voltage circuit breaker 10 of transformer bank A; then opening of the tap switch AT2; then closing of tap switch AT3; then closing of the high voltage circuit breaker 10 of bank A; then opening of the high voltage circuit breaker 10 of bank B; then opening of tap switch BT2; then closing of tap switch BT3; then again closing of high voltage circuit breaker 10 of bank B; and finally again subjecting the control of the connections of the two circuit breakers to the control switches 71 to 74; drum D2—3 being now likewise in its position P13.

The system may now continue to operate in this condition. If the line conditions require a further increase of the transformation ratio of the transformer and actuation of the line relay 81 accordingly so as to bring contact member 82 upwardly into engagement with the contact members R1—2, R2—3, R3—4, then the actuating coil R3—4 of drum D3—4 will be energized, the energizing circuit for the actuating coil R3—4 leading by way of an energizing source 25 through the interlocking contacts 55 and 50 of drum D2—3 to the ground return. This will bring about movement of the drum D3—4 from position P1 to position P13 and cause a sequence of operations similar in every respect to the sequence of operations performed by drum D2—3, causing as a result, tap switches AT3 and BT3 to open and tap switches AT4 and BT4 to close, and reestablish the connections of the transformer banks in accordance with the positions of the control switches 71 to 74.

If, on the other hand, in any of the positions where either tap switch AT2, AT3 or AT4 are closed, the line relay 81 registered a condition which requires lowering of the transformation ratio, contact member 82 will move downwardly into engagement with the contact members L1—2, L2—3 and L3—4. As a result, suitable energizing circuits will be established for causing movement of the respective drums in the direction opposite to that described above and bringing about a sequence of operations of the various switches and contactors, whereby with the help of one transformer bank, the other transformer bank is momentarily unloaded and has its tap-changing switches connected to a position corresponding to the next lower transformation ratio.

To illustrate the operation of the system in connection with such lowering of the transformation ratio, let us consider the equilibrium condition of the system in which both transformer banks have the transformer tap switches AT3 and BT3, respectively, closed, transformer bank A being loaded and transformer bank B being normally without load. In this condition of the system, drums D1—2 and D2—3 will be in position P13 and drum D3—4 will be in position P1. If the line condition now causes the relay 81 to move its contact member 82 to its lower position, the contact member 82 will establish engagement with contacts L1—2, L2—3 and L3—4. Drum D3—4 is already in its extreme position P1 and energization of coil L3—4 will have no further effect. Since drum D2—3 is in its position P13, the energizing circuit for the actuating coil L1—2 of drum D1—2 will be open at the interlocking contact 54 and drum D1—2 will remain at rest. However, an energizing circuit will be completed for actuating coil L2—3 by way of its energy source 25 and the interlocking contacts 56, 49 on drum D3—4, setting drum D2—3 into movement from the position P13 to P1.

As can be readily followed by tracing the circuits, this movement of the drum D2—3 will again, for the duration of the movement between the position P12 and P2, energize through contact bar 51 the actuating coil 59 of interlocking relay 60, opening the control circuits of the control switches 71 to 74 of the two high voltage circuit breakers and securing closure of both low voltage circuit breakers.

In position P11 the drum will cause closure of the high voltage circuit breaker of bank B; in position P10 the high voltage circuit breaker of bank B is again opened; in the next position P9 the tap switch BT3 is opened; in the next position P8 the tap switch BT2 is closed; in the next position P7 the high voltage circuit breaker of bank B is again closed; in the next position P6 the high voltage circuit breaker 10 of bank A is opened; in the next position P5 the tap switch AT3 is opened; in the next position P4 the tap switch AT2 is closed; in the next position P3 the circuit breaker 10 of bank A is closed; in the following two positions the two transformer banks are again restored to their normal operating conditions.

The interlocking contacts 49, 50 on the several drums and the circuits associated therewith are so arranged that drums D2—3 and D3—4 cannot be actuated for movement from position P1 as long as drum D1—2 has not reached position P13; the drums D2—3 and D1—2 cannot move from position P13 as long as drum D3—4 is not in position P1; and drum D1—2 cannot move from position P13 if drums D2—3 and D3—4 are not in position P1.

In the specific operating instance described above, it was assumed that the operator desires to carry the load on transformer bank A and that transformer bank B shall normally remain unloaded. The arrangement of the system as shown in the drawings and described above permits, however, the utilization of either of the two transformer banks to carry the load while using the other as a stand-by, or the utilization of both transformer banks to carry the load while fully retaining the advantages of regulation of the tap connections under load in the manner described above. Thus, for instance, if transformer bank B is to carry the load and transformer bank A is to serve only as a stand-by, control switch 71 and control switch 73 will be thrown to the left into engagement with contacts CAO and CaO, and the control switches 72 and 74 will be thrown to the right into engagement with the contacts CBC and CbC. This will cause the transformer bank B to remain normally connected to the lines 1 and 2, and transformer bank A to be normally disconnected from the lines. In case of a change in the line conditions that will cause the line relay 81 to actuate its contact member 82 to move upwardly or downwardly into engagement with the associated contact members, the system will undergo regulating cycles and bring about tap-changing operations in exactly the same manner as described in the instance discussed first, with the only difference that after the completion of the cycle of the tap-changing operations, transformer bank A will be disconnected from the lines, while transformer bank B will remain connected.

If both transformer banks A and B are to remain constantly on the lines and carry the load, all of the switches 71 to 74 are thrown to the right, causing as a result, the high voltage circuit breakers as well as the low voltage circuit breakers of both transformer banks A and B to be normally closed. With this arrangement, the relay 81 will bring about its tap-changing operations in the same way as in the case where only one of the transformer banks is normally connected to the line, the tap-changing operations being initiated and carried out in exactly the same manner as before.

The principles of my invention underlying the exemplification described above are not limited to any particular details of the circuits and switches referred to hereinbefore; thus, for instance, instead of individually controlled tap switches, any of the various mechanical forms of tap switches may be used. Instead of separately actuated control drums for bringing about the sequence of operations connected with each tap-changing step, any other of the familiar types of interlocking mechanisms may be used. In general, my invention contemplates the utilization of all the usual protective features employed in connection with power systems, but in the description here given, I have omitted all these features for the sake of clearness.

While I have given herein a description of an exemplification of my invention wherein only two transformer banks are used, to mutually cooperate in carrying out the tap-changing operations in accordance with the line conditions, the principles underlying the arrangement are also applicable to systems where more than two transformer banks are used and where one transformer bank or another is selectively used to cooperate with the transformer banks under load in connection with the tap-changing operations instead of the practice followed heretofore, where each transformer is provided with two separate windings with special circuit breakers for each winding so that each transformer has to carry out by itself the tap-changing operations. The invention also contemplates the application of the principles described above to arrangements where a single stand-by transformer or like unit cooperates with a plurality of transformer units constituting for instance, three phases of a transformer bank, so as to effect tap-changing of the individual units of the three phases of the bank, by causing the stand-by unit to cooperate in sequence with each of the three units of the three-phase bank, momentarily taking over the load from each of these until the tap-changing operation has been carried out on all three units.

As will be seen from the foregoing, my invention has a wide field of applications and is susceptible of embodiment in a great many modifications, and it is accordingly desired that the appended claims be given a broad construction commensurate with the scope of the invention within the art.

I claim:

1. In a transformer regulating system, a power line, two independently operable transformers having each separate windings for connection to said power line, an independently operable circuit breaker for each transformer to selectively effect connection or disconnection of the transformer windings from or to the line, a plurality of tap connections on each transformer winding, a tap-changing mechanism on each transformer winding for changing the tap connections, independent control means for each of said circuit breakers to independently control their normal conditions, means for initiating and carrying out tap-changing operations on said transformers, said means including means actuated in response to the initiation of a tap-changing operation to alternately actuate said circuit breakers to alternately disconnect the windings of each transformer from the line while the windings of the other transformer are held connected to the line; and to alternately cause the tap-changing mechanism on each transformer to effect a tap-changing operation on the windings while its associated circuit breaker is open and the circuit breaker of the other transformer is closed.

2. In a transformer regulating system, a power line, a first independently operable transformer having windings, a second independently operable transformer having windings, a circuit breaker for independently controlling the connections of the windings of the first transformer to the line, a circuit breaker for independently controlling the connections of the windings of the second transformer to the line, circuit breaker control means for independently controlling the normal operating condition of said circuit breakers, a plurality of tap connections on each transformer winding, a tap-changing mechanism on each transformer for changing the tap connections in a plurality of steps, means for initiating a tap-changing operation, means for holding the tap-changing mechanism of one transformer interlocked in related position with the tap-changing mechanism of the other transformer, and means for securing interlocked control of the tap-changing mechanisms and the circuit breakers whereby upon operation of said tap-change initiating means, tap-changing operations are alternately carried out by the tap-changing mechanisms of said two transformers, and the circuit breakers associated with said transformers are operated to alternately disconnect the transformer on which the tap-changing operation is being carried out, while the load is shifted to the other transformer and then the normal operating connections again restored.

3. In a transformer regulating system, a first independently operable transformer, a second independently operable transformer, a power line, a circuit breaker controlling the connection of the first transformer to the line; a circuit breaker controlling the connection of the second transformer to the line, a plurality of tap connections on each transformer, a tap-changing mechanism on each transformer to vary the tap connections, means for selectively determining the normal operating condition of said circuit breakers to predeterminedly load said transformers, means for initiating a tap-changing operation on one of said transformers while its associated circuit breaker is closed, and means operable in response to said initiating means to effect interlocked control of said circuit breakers and said tap-changing mechanisms to cause the circuit breaker of one transformer to be held closed and the circuit breaker of the other transformer to be held open, while the tap-changing mechanism of said other transformer is actuated to carry out a change in tap connections, and to thereupon cause the circuit breaker of said other transformer to close and that of the first transformer to open, and to cause the tap-changing mechanism of said first transformer to effect a change of the tap connections, and to thereupon restore the normal connections of the circuit breakers.

4. In a transformer regulating system, two independently operable transformers, a power line, an independently operable circuit breaker for each transformer to selectively effect connection or disconnection of the transformer to or from the line, a plurality of tap connections on each transformer, a tap-changing mechanism on each transformer for changing the tap connections, independent control means for said circuit breakers to independently control their normal conditions, means for initiating and carrying out tap-changing operations on said transformers, said means including interlocked operating means for said circuit breakers and said tap-changing mechanisms operating to alternately carry out the tap-changing operation on one transformer while the other transformer is connected to the line and then restore the normal operating conditions.

5. In a transformer regulating system, a first independently operable transformer, a second independently operable transformer, a power line, a circuit breaker for controlling the connections of the first transformer to the line, a circuit breaker for controlling the connections of the second transformer to the line, circuit breaker control means for independently controlling the normal operating condition of said circuit breakers, a plurality of tap connections on each transformer, tap-changing mechanism on each transformer for changing the tap connections in a plurality of steps, means for initiating a tap-changing operation on said first transformer while its associated circuit breaker is closed, means actuated by said initiating means for transferring the load from said first transformer to said second transformer, means for thereupon opening the circuit breaker of said first transformer, means for thereupon actuating the tap-changing mechanism of said first transformer to effect a change in the tap connections, means for closing the circuit breaker of said first transformer to load it again, and means for interlocking the circuit breaker and tap-changing mechanism of said second transformer to bring the tap-changing mechanism of said second transformer into step with the tap-changing mechanism of the first transformer while the circuit breaker of the second transformer is open.

6. In a transformer regulating system, two independently operable transformers, a power line, an independently operable circuit breaker for each transformer to selectively effect connection or disconnection of the transformer to or from the line, a plurality of tap connections on each transformer, a tap-changing mechanism on each transformer for changing the tap connections, independent control means for said circuit breakers to independently control their normal conditions, means for initiating and carrying out tap-changing operations on said transformers, said means including interlocking means between the circuit breakers and tap-changing mechanisms of said two transformers to restrict the operation of the tap-changing mechanism of one transformer to periods when the circuit breaker associated with said transformer is open and the circuit breaker associated with the other transformer is closed.

7. In a transformer regulating system, a first independently operable transformer, a second independently operable transformer, a power line, a circuit breaker for controlling the connections of the first transformer to the line, a circuit breaker for controlling the connections of the second transformer to the line, circuit breaker control means for independently controlling the normal operating condition of said circuit breakers, each transformer having a plurality of tap connections, a tap-changing mechanism for changing said tap connections to vary the transformation ratio of each transformer in a plurality of steps, interlocking means for alternately actuating the tap-changing mechanisms and the circuit breakers of said transformers whereby the tap-changing mechanisms of each transformer alternately carry out in sequence one step of the tap-changing operations, and means for interlocking the operations of the circuit breakers with the operations of said tap-changing mechanisms whereby the tap-changing mechanism of each circuit breaker operates only during the period when its associated circuit breaker is open and the circuit breaker of the other transformer is closed.

8. In a transformer regulating system, a polyphase power line for carrying electric power supplied thereto, two, independently operable, polyphase transformer banks having each a number of phase windings coreponding to the phases of said line, a circuit breaker for each of said transformer banks having a number of breaking units connected between the transformer winding and line of corresponding phase to independently control the connections of each transformer bank to the line, independent control means for said circuit breakers for independently controlling their normal conditions, a tap-changing mechanism on each transformer winding connected through said circuit breakers to the line for changing the number of turns of the winding in a plurality of steps, means for initiating a tap-changing operation, and means actuated by said initiating means for interlocking the circuit breakers and the tap-changing mechanisms of said two transformer banks and causing successive operation of the tap-changing mechanisms of each of said transformer banks with its circuit breaker in open position, and the circuit breaker of the other transformer bank in closed position.

In testimony whereof I have hereunto subscribed my name.

PHILIP SPORN.